United States Patent
Sachs et al.

(10) Patent No.: US 10,104,521 B2
(45) Date of Patent: Oct. 16, 2018

(54) METHOD AND APPARATUS FOR CGW SELECTION

(71) Applicant: Telefonaktiebolaget LM Ericsson (publ), Stockholm (SE)

(72) Inventors: Joachim Sachs, Sollentuna (SE); Ari Keränen, Helsinki (FI); Johan Rune, Lidingö (SE); Anders E. Eriksson, Kista (SE); Francesco Militano, Stockholm (SE); Nicklas Beijar, Kirkkonummi (FI); Vlasios Tsiatsis, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 90 days.

(21) Appl. No.: 15/116,962

(22) PCT Filed: Feb. 21, 2014

(86) PCT No.: PCT/SE2014/050214
§ 371 (c)(1),
(2) Date: Aug. 5, 2016

(87) PCT Pub. No.: WO2015/126294
PCT Pub. Date: Aug. 27, 2015

(65) Prior Publication Data
US 2016/0353228 A1 Dec. 1, 2016

(51) Int. Cl.
*H04M 3/16* (2006.01)
*H04W 4/70* (2018.01)
(Continued)

(52) U.S. Cl.
CPC ............... *H04W 4/70* (2018.02); *H04W 4/80* (2018.02); *H04W 12/06* (2013.01); *H04W 48/17* (2013.01)

(58) Field of Classification Search
CPC ..... H04W 4/005; H04W 88/16; H04W 48/18; H04W 76/026; H04W 84/18; H04W 12/06
See application file for complete search history.

(56) References Cited

U.S. PATENT DOCUMENTS 9,338,070 B2   5/2016   Singh
9,730,176 B2 * 8/2017   Starsinic ............... H04W 60/04
(Continued)

FOREIGN PATENT DOCUMENTS

EP   2306766 A1   4/2011
EP   2309790 A2   4/2011
(Continued)

OTHER PUBLICATIONS

Author Unknown, "Machine-to-Machine communications (M2M); Functional architecture," Draft, Technical Specification 102 690, Version <0.9.6>, European Telecommunications Standards Institute, Dec. 2010, 191 pages.
(Continued)

Primary Examiner — Khalid Shaheed
(74) Attorney, Agent, or Firm — Withrow & Terranova, PLLC

(57) ABSTRACT

The invention relates to selecting a capillary gateway node via which a Machine Type Communication (MTC) device is to be connected to a radio access network. The network node configured to select a capillary network gateway node for connecting an MTC device to a radio access network comprises a processing unit and a memory containing instructions executable by the processing unit. The network node is operative to obtain an indication of availability of credentials of a plurality of capillary network gateway nodes being capable of connecting the MTC device to the radio access network, and to select one of the plurality of capillary network gateway nodes via which the MTC device is to be
(Continued)

connected to the radio access network based at least in part on the availability of credentials of the plurality of capillary network gateway nodes.

16 Claims, 7 Drawing Sheets

(51) Int. Cl.
*H04W 4/80* (2018.01)
*H04W 48/00* (2009.01)
*H04W 12/06* (2009.01)

(56) References Cited

U.S. PATENT DOCUMENTS

| | | | |
|---|---|---|---|
| 9,820,189 | B2 | 11/2017 | Novo Diaz et al. |
| 2007/0047561 | A1 | 3/2007 | Chen et al. |
| 2008/0019313 | A1 | 1/2008 | Vogety |
| 2009/0041039 | A1 | 2/2009 | Bear et al. |
| 2009/0175204 | A1 | 7/2009 | Kim |
| 2011/0081903 | A1 | 4/2011 | Cai et al. |
| 2011/0228750 | A1* | 9/2011 | Tomici .............. H04W 8/082 370/338 |
| 2012/0113971 | A1 | 5/2012 | Giaretta et al. |
| 2012/0128090 | A1 | 5/2012 | Seok |
| 2012/0287854 | A1 | 11/2012 | Xie et al. |
| 2013/0070775 | A1 | 3/2013 | Qu |
| 2013/0142059 | A1* | 6/2013 | Di Girolamo .......... H04L 12/66 370/252 |
| 2013/0155948 | A1* | 6/2013 | Pinheiro ............... H04W 4/005 370/328 |
| 2013/0188515 | A1* | 7/2013 | Pinheiro ............... H04W 4/001 370/254 |
| 2013/0203412 | A1* | 8/2013 | Starsinic .............. H04W 4/001 455/435.1 |
| 2013/0311640 | A1 | 11/2013 | Gleixner et al. |
| 2013/0322329 | A1 | 12/2013 | Visuri et al. |
| 2014/0016466 | A1 | 1/2014 | Calvanese Strinati |
| 2014/0064232 | A1 | 3/2014 | Chang et al. |
| 2014/0112301 | A1 | 4/2014 | Shu et al. |
| 2014/0129672 | A1 | 5/2014 | Singh |
| 2014/0167929 | A1 | 6/2014 | Shim et al. |
| 2014/0328254 | A1 | 11/2014 | Lim |
| 2015/0050954 | A1 | 2/2015 | Kameno et al. |
| 2015/0256349 | A1 | 9/2015 | Kim et al. |
| 2015/0264668 | A1 | 9/2015 | Takehana et al. |
| 2016/0065472 | A1 | 3/2016 | Gleixner et al. |
| 2016/0283191 | A1 | 9/2016 | Lu |
| 2016/0353227 | A1 | 12/2016 | Sachs et al. |
| 2016/0353326 | A1 | 12/2016 | Novo Diaz et al. |
| 2017/0013059 | A1 | 1/2017 | Keranen et al. |
| 2017/0048792 | A1 | 2/2017 | Sachs et al. |
| 2017/0055310 | A1 | 2/2017 | Sachs et al. |
| 2017/0071024 | A1 | 3/2017 | Sachs et al. |
| 2017/0085490 | A1 | 3/2017 | Sachs et al. |
| 2017/0171806 | A1 | 6/2017 | Sachs et al. |
| 2017/0303177 | A1 | 10/2017 | Ngounou |
| 2017/0311304 | A1 | 10/2017 | Lu |

FOREIGN PATENT DOCUMENTS

| | | |
|---|---|---|
| WO | 2011112683 A1 | 9/2011 |
| WO | 2012136005 A1 | 10/2012 |
| WO | 2013157577 A1 | 10/2013 |
| WO | 2015126295 A1 | 8/2015 |
| WO | 2015126296 A1 | 8/2015 |

OTHER PUBLICATIONS

Author Unknown, "Technical Specification Group Services and System Aspects; Architecture enhancements to facilitate communications with packet data networks and applications (Release 11)," Technical Specification 23.682, Version 11.3.0, 3GPP Organizational Partners, Dec. 2012, 29 pages.
Author Unknown, "Technical Specification Group Services and System Aspects; Generic Authentication Architecture (GAA); Generic Bootstrapping Architecture (GBA) (Release 12)," Technical Specification 33.220, Version 12.0.0, 3GPP Organizational Partners, Mar. 2013, 92 pages.
International Search Report and Written Opinion for International Patent Application No. PCT/SE2014/050215, dated Feb. 5, 2015, 16 pages.
International Search Report and Written Opinion for International Patent Application No. PCT/SE2014/050216, dated Feb. 3, 2015, 10 pages.
International Search Report and Written Opinion for International Patent Application No. PCT/SE2014/050214, dated Dec. 17, 2014, 11 pages.
Final Office Action for U.S. Appl. No. 15/116,899, dated Feb. 7, 2018, 18 pages.
Non-Final Office Action for U.S. Appl. No. 15/116,899, dated Oct. 3, 2017, 18 pages.
Non-Final Office Action for U.S. Appl. No. 15/116,931, dated Dec. 1, 2017, 17 pages.
Kim et al., "Effective M2M gateway selection algorithms for geographical region-based query," Information and Communication Technology Convergence (ICTC), 2010 International Conference, Nov. 17-19, 2010, Jeju, South Korea, IEEE, pp. 413-414.
Beijar, N., et al., "Gateway Selection in Capillary Networks," 2015 5th International Conference on the Internet of Things (IoT), Oct. 26-28, 2015, Seoul, South Korea, 8 pages.
Advisory Action for U.S. Appl. No. 15/116,899, dated Apr. 23, 2018, 3 pages.
Notice of Allowance for U.S. Appl. No. 15/116,899, dated Jun. 11, 2018, 9 pages.
Notice of Allowance for U.S. Appl. No. 15/116,931, dated Jun. 8, 2018, 7 pages.

\* cited by examiner

METHOD AND APPARATUS FOR CGW SELECTION

This application is a 35 U.S.C. § 371 national phase filing of International Application No. PCT/SE2014/050214, filed Feb. 21, 2014, the disclosure of which is incorporated herein by reference in its entirety.

TECHNICAL FIELD

The invention relates to a method of selecting a capillary gateway node via which a Machine Type Communication (MTC) device is to be connected to a radio access network, an MTC device performing the method and a network node performing the method. The invention further relates to computer programs performing the methods according to the present invention, and computer program products comprising computer readable medium having the computer programs embodied therein.

BACKGROUND

Over the last years, a cellular communications network structure known as the Internet of Things has emerged. Generally, this network structure comprises a huge number of small autonomous devices, which typically, more or less infrequently (e.g. once per week to once per minute) transmit and receive only small amounts of data, or are polled for data. These devices are sometimes referred to as Machine Type Communication (MTC) devices, Machine-to-Machine (M2M) devices or just Machine Devices (MDs), and are assumed not to be associated with humans, but are rather sensors or actuators of different kinds, which typically communicate with application servers (which configure and receive data from the devices) within or outside the cellular network.

With the nature of MTC devices and their assumed typical uses follow that these devices generally will have to be energy efficient, since external power supplies not necessarily are available and since it is neither practically nor economically feasible to frequently replace or recharge their batteries. In some scenarios the MTC devices may not even be battery powered, but may instead rely on energy harvesting, i.e. gathering energy from the environment, opportunistically utilizing (the often very limited) energy that may be tapped from sun light, temperature gradients, vibrations, etc.

So far, the MTC related work in 3rd Generation Partnership Project (3GPP) has focused on MTC devices directly connected to the cellular network via the radio interface of the cellular network. However, a scenario which is likely to be more prevalent is that most MTC devices connect to the cellular network via a gateway. In such scenarios the gateway acts like a User Equipment (UE) towards the cellular network while maintaining a local network, typically based on a short range radio technology towards the MTC devices. Such a local network, which in a sense extends the reach of the cellular network (to other radio technologies but not necessarily in terms of radio coverage) has been coined capillary network and the gateway connecting the capillary network to the cellular network is thus referred to as a capillary network gateway (CGW). Hence, the capillary network comprises one or more CGWs and a plurality of MTC devices, which connect to a Radio Access Network (RAN) of an available cellular communications network via the one or more CGWs.

Radio technologies that are expected to be common in capillary networks include e.g. IEEE 802.15.4 (e.g. with IPv6 over Low power Wireless Personal Area Networks (6LoWPAN) or ZigBee as higher layers), Bluetooth Low Energy or low energy versions of the IEEE 802.11 family (i.e. Wi-Fi). A capillary network may be single hop (i.e. all MTC devices have a direct link to the CGW), e.g. a Wi-Fi network with the CGW as the access point, or multi-hop (i.e. some MTC devices may have to communicate via one or more other MTC devices to reach the CGW), e.g. an IEEE 802.15.4+ZigBee network with the CGW being a Personal Area Network (PAN) controller. In multi-hop cases, the Routing Protocol for Low-Power and Lossy Networks (RPL) may be used. In principle, RPL may be used also in single hop networks, but there is less need for a routing protocol in such networks.

The field of capillary networks is still not abundantly explored and many issues are still to be resolved. For instance, a problem to be solved is to how handle authentication, identification and/or secure communication of the MTC devices towards the cellular network.

SUMMARY

It is an object of the present invention to solve, or at least mitigate this problem in the art and to provide an improved method and device for selecting a capillary network gateway node for connecting a wireless device, such an MTC device, to a radio access network.

This object is attained in a first aspect of the present invention by a method of selecting a capillary network gateway node for connecting an MTC device to a radio access network. The method comprises obtaining an indication of availability of credentials of a plurality of capillary network gateway nodes being capable of connecting the MTC device to the radio access network. The method further comprises selecting one of the plurality of capillary network gateway nodes via which the MTC device is to be connected to the radio access network based at least in part on the availability of credentials of the plurality of capillary network gateway nodes.

This object is attained in a second aspect of the present invention by a network node configured to select a capillary network gateway node for connecting an MTC device to a radio access network. The network node comprises a processing unit and a memory containing instructions executable by the processing unit. The network node is thereby operative to obtain an indication of availability of credentials of a plurality of capillary network gateway nodes being capable of connecting the MTC device to the radio access network, and to select one of the plurality of capillary network gateway nodes via which the MTC device is to be connected to the radio access network based at least in part on the availability of credentials of the plurality of capillary network gateway nodes.

This object is attained in a third aspect of the present invention by an MTC device configured to select a capillary network gateway node for connecting to a radio access network. The MTC device comprises a processing unit and a memory containing instructions executable by the processing unit. The MTC device is thereby operative to obtain an indication of availability of credentials of a plurality of capillary network gateway nodes being capable of connecting the MTC device to the radio access network, and to select one of the plurality of capillary network gateway nodes via which the MTC device is to be connected to the radio access network based at least in part on the availability of credentials of the plurality of capillary network gateway nodes.

Further provided are computer programs performing the methods according to the present invention, and computer program products comprising computer readable medium having the computer programs embodied therein.

Advantageously, by implementing a capillary gateway (CGW) selection process for connecting a wireless device, referred to in the following as an MTC device, to a radio access network according to embodiments of the present invention, a control mechanism for selecting one out of a plurality of available CGWs is provided. In particular, selection of a CGW is enabled while taking into account authentication, identification and/or security requirements of e.g. a telecommunication operator in the cellular network. This is undertaken by determining which one out of a plurality of CGWs to select for connecting the MTC device to the radio access network based on the availability of credentials of the plurality of CGWs, such as the number of credentials available, the credentials being embodied for instance in the form of a shared secret such as a secret encryption key, passwords, identifiers, etc. held by an authenticating entity in the network (and the selected CGW).

In an embodiment of the present invention, the CGW having the greatest number of credentials available, in order to have the MTC device engage in communication relating to authentication, identification and/or confidentiality using the credentials, is selected. Advantageously, the risk of depleting a CGW of credentials is less when turning to the CGW having the greatest number of credentials.

In another embodiment of the present invention, it is determined whether the number of credentials available at the respective CGW in equal to or exceeds a predetermined credential threshold value. If that is the case, one of the CGWs having a number of credentials exceeding the threshold value may be connected to. Advantageously, great flexibility is offered in that the threshold can be set such that no CGW is selected which is at the risk of being depleted of credentials. For instance, the credential threshold value could be set to correspond to a number of credentials enough to serve two MTC devices. By choosing such a threshold value, at least two MTC devices can be served with credentials.

The CGW selection is in further embodiments complemented with additional criteria which must be fulfilled for a CGW to be selected (even though it has a great number of credentials available), such as one or more of: channel quality, required transmission power, battery/energy status of the MTC device, physical location, distance to CWG or capillary network technology used by the various CGWs, etc. Thus, even though a CGW may have access to credentials, these credentials may still not be available to the MTC device, e.g. due to the CGW being unreachable for the MTC device.

The present invention improves the CGW selection in capillary networks by taking credential information into account when making the selection, thereby enabling the network to have more control of the choice of CGW of the MTC devices. In addition, enabling selection of CGWs with appropriate availability of credentials avoids the risk of MTC devices not being able to authenticate or identify themselves towards appropriate nodes in the cellular network and/or to engage in secure communication requiring the appropriate credentials.

Thus, the MTC device, or a network node such as the CGW itself being for instance a Wi-Fi Access Point (AP), or any other appropriate network node, determines which CGW out of a plurality of CGWs should be selected on the basis of the availability of credentials at the CGWs.

In further embodiments of the present invention, the network node is a Serving Gateway (SGW), a Packet Data Network Gateway (PGW) or an Evolved NodeB (eNodeB) in a Long Term Evolution (LTE) network, a Serving General Packet Service Support Node (SGSN), a Gateway General Packet Service Support Node (GGSN), a Radio Network Controller (RNC), or a NodeB in a Universal Mobile Telecommunication System, UMTS, network, or an SGSN, a GGSN, a Base Station Controller (BSC), or a Base Transceiver Station (BTS) in a Global System for Mobile communications (GSM) network. The network node may further be a Services Capability Server (SCS).

Further embodiments of the present invention will be described in the detailed description of the invention.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
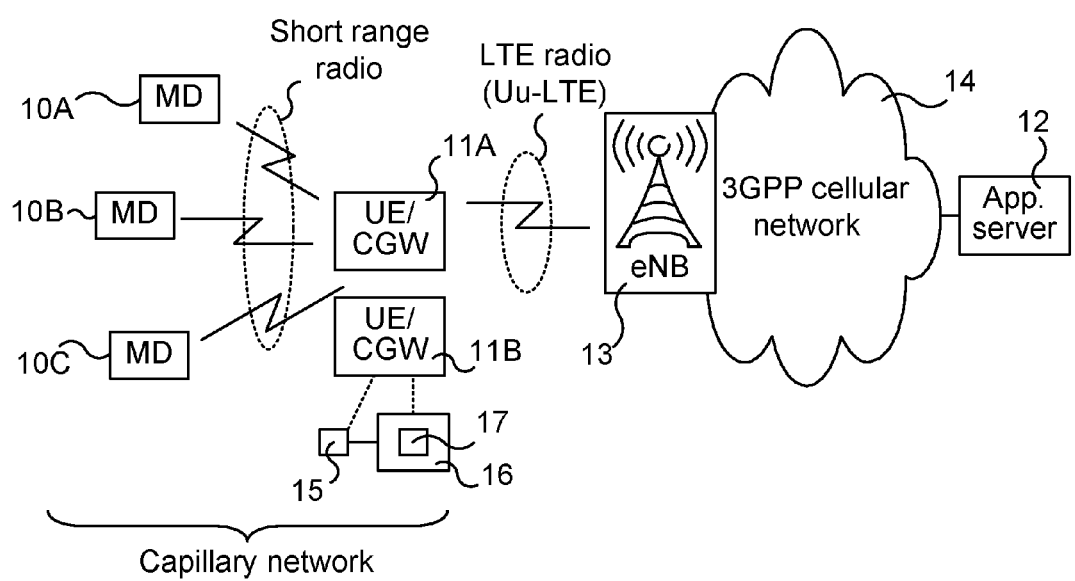
FIG. 1 illustrates a capillary network according to an embodiment of the present invention.

FIG. 1 illustrates a capillary network according to an embodiment of the present invention. A number of wireless devices referred to as Machine Devices (MDs) or Machine Type Communication (MTC) devices 10A, 10B, 10C connect to a plurality of Capillary Network Gateways (CGWs) 11A, 11B, typically via short range radio communication such as Near Field Communications (NFC), Radio-Frequency Identification (RFID), Wireless Local Area Network (WLAN), Bluetooth or any technology utilizing the IEEE 802.15.4 standard, such as ZigBee or MiWi. The capillary network may for instance be implemented in a factory setting where the MTC devices 10A, 10B, 10C could amount to hundreds or even thousands of sensors for measuring physical properties (such as temperature, pressure, energy consumption, etc.) of an industrial process and reporting via the CGWs 11A, 11B in the form of Wi-Fi Access Points (APs) to an application server 12 via an eNodeB 13 of a RAN in an LTE network 14.

Now, for authentication, identification and/or security reasons, it may be necessary to communicate 3GPP credentials to the MTC devices 10A, 10B, 10C for communication with for instance the application server 12. These credentials could include MTC device identification (ID) data in the form of e.g. a serial number, an International Mobile Subscriber Identity (IMSI), encryption keys, shared secrets, etc. In another example, to be able to perform authentication or communicate securely, the MTC devices 10A, 10B, 10C may need to have access to a subscription token stored in an application, such as an ISIM (Internet Protocol Multimedia Services Identity Module) or USIM (Universal Subscriber Identity Module) or an electronically transferable subscriber identity module such as an MCIM (Machine Communications Identity Module), which can be downloaded from the network 14 via the CGWs 11A, 11B. It is also possible that the credentials and/or subscription token(s) are not conveyed to the MTC device(s), but are only downloaded to, or otherwise stored in the CGW. In this alternative scenario the CGW may execute the authentication procedure on behalf of an MTC device.

To conclude, a variety of credentials can be envisaged for providing network identification, authentication and/or security in communication between the MTC devices 10A, 10B, 10C and any suitable authenticating entity in the network 14 such as the server 12. Further, the MTC devices 10A, 10B, 10C may be authenticated by the application server 12 in accordance with any appropriate authentication procedure, such as for instance Generic Bootstrapping Architecture (see 3GPP TS 33.220 V12.0.0). Generally, but not necessarily, the CGWs 11A, 11B are under the control of an operator of the cellular network 14 even though the cellular network operator does not necessarily own the CGW.

With further reference to FIG. 1, the network node in which embodiments of the present invention is implemented could, as previously has been discussed, be any one of the CGWs 11A, 11B. In practice, the method at the CGW 11A, 11B of connecting the MTC devices 10A, 10B, 10C to the RAN of the 3GPP network 14 is performed by a processing unit 15 embodied in the form of one or more microprocessors arranged to execute a computer program 17 downloaded to a suitable storage medium 16 associated with the microprocessor, such as a Random Access Memory (RAM), a Flash memory or a hard disk drive. Thus, as is illustrated by means of dashed lines in FIG. 1, the processing unit 15 and the storage medium are included in the CGW 11B. The processing unit 15 is arranged to carry out the method according to embodiments of the present invention when the appropriate computer program 17 comprising computer-executable instructions is downloaded to the storage medium 16 and executed by the processing unit 15. The storage medium 16 may also be a computer program product comprising the computer program 17. Alternatively, the computer program 17 may be transferred to the storage medium 16 by means of a suitable computer program product, such as a Digital Versatile Disc (DVD) or a memory stick. As a further alternative, the computer program 17 may be downloaded to the storage medium 16 over a network. The processing unit 15 may alternatively be embodied in the form of a digital signal processor (DSP), an application specific integrated circuit (ASIC), a field-programmable gate array (FPGA), a complex programmable logic device (CPLD), etc. Further, even though not shown in FIG. 1, the MTC devices typically comprise a corresponding processing unit and memory unit comprising a computer program executable by the processing unit.

There are two potential ways for the 3GPP credentials (will be referred to in the following as "the credentials") to be used for MTC device authentication. Either the CGWs 11A, 11B (or some other appropriate network node) act on behalf of the MTC devices 10A, 10B, 10C in an authentication procedure or the CGWs 11A, 11B assign the credentials to the MTC devices, so that they can use the credentials themselves during an authentication procedure.

To this end, a CGW may have a set, or a pool, of such credentials, which are dynamically used for—or by—different MTC devices that are connected to the CGW. Hence, the number of available credentials in a CGW may vary and the pool of credentials may even be depleted. The CGW may then have to turn to a supervising node in the network for more credentials.

When the availability of credentials in the CGWs is taken into account in the CGW selection in accordance with embodiments of the present invention, the CGW selection is improved, thereby enabling the network to have more control of the choice of CGW of the MTC devices. In addition, enabling selection of CGWs with appropriate availability of credentials avoids the risk of MTC devices not being able to authenticate or identify themselves towards appropriate nodes in the cellular network and/or to engage in secure communication requiring the appropriate credentials. Further, by carefully selecting CGWs on the basis of availability of credentials, a more even distribution of credentials among the CGWs is attained, thereby potentially decreasing the rate with which the CGWs may have to turn to the network for more credentials.

Figure 2A:
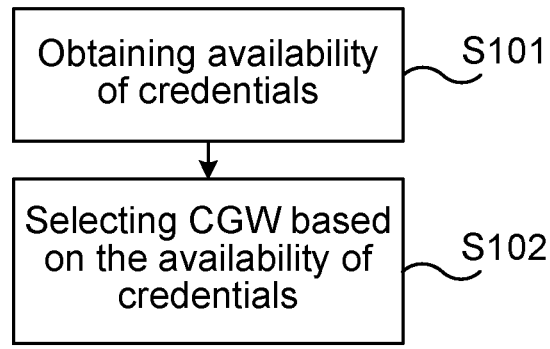
FIG. 2A illustrates a flow chart of an embodiment of the method according to the present invention.

FIG. 2A illustrates a flow chart of an embodiment of the method according to the present invention. Reference is further made to network elements shown in FIG. 1. Thus, assuming that a first MTC device 10A is about to connect to the eNodeB 13 of the RAN of the network 14 (via one of the available CGWs). This may either imply establishing a new connection to a CGW or handing over an established connection from one CGW to another. In a first step S101, availability of credentials of a first CGW 11A and a second CGW 11B being capable of connecting the MTC device 10A to the RAN is obtained. Thus, either the first MTC device 10A acquires an indication of the number of credentials of the first and second CGW 11A, 11B, respectively, or any one or both of the CGWs (or another network node being responsible for this particular task) acquire said indication and inform the first MTC device 10A accordingly. It is possible that all CGWs in a certain capillary network are aware of the number of credentials available at each individual CGW, and that an MTC device simply acquires an indication of the number of credentials by receiving the indication either from the respective CGW, or from a single CGW reporting to the MTC device on behalf of the other CGWs. This single CGW may for instance be the CGW which subsequently is to be selected for connecting the MTC device to the RAN. In this particular exemplifying embodiment, the first CGW 11A has access to more credentials than the second CGW 11B, assuming for instance that the first CGW 11A has access to 20 credentials while the second CGW 11B has access to 10 credentials. Hence, in step S102, the first MTC device 10A connects to the radio access network via one of the at least two gateway based on the number of credentials available at the two gateway nodes, wherein in this particular exemplifying embodiment, the CGW 11A having the greatest number of credentials available is selected for connecting the first MTC device 10A to the RAN.

Figure 2B:
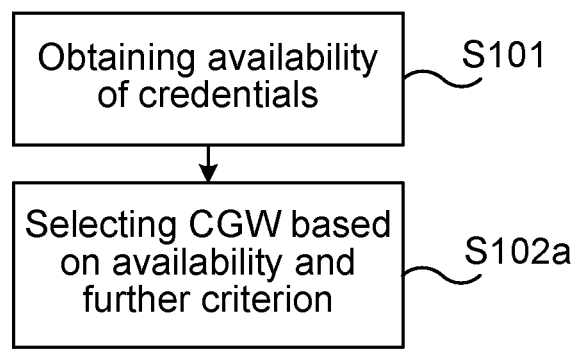
FIG. 2B illustrates a flow chart of a further embodiment of the method according to the present invention.

FIG. 2B illustrates a flow chart of a further embodiment of the method according to the present invention. Reference is further made to network elements shown in FIG. 1. In this exemplifying embodiment, the first CGW 11A and the second CGW 11B still have 20 and 10 credentials, respectively, as determined in step S101, but a further criterion is also considered before a CGW is selected for connecting the MTC device 10A, 10B, 10C to the RAN. This criterion includes for example any one or more of: channel quality, required transmission power, battery/energy status of the MTC device, physical location, distance to CWG or capillary network technology used by the various CGWs, etc. Thus, assuming for example that the quality is poor for a channel to be established between the first MTC device 10A and the first CGW 11A having the greatest number of credentials available, implying that the first CGW 11A does not satisfy predetermined quality criteria for the communication, the first MTC device 10A is connected to the RAN via the selected second CGW 11B having a sufficiently good estimated communication quality in step S102a, even though its number of credentials are lower. As mentioned, other exemplifying criteria that may have to be satisfied are e.g. a maximum distance to the CGW, maximum required transmission power of the MTC device, compliance of MTC device with CGW technology, no increase in required MTC device transmission power is allowed, etc.

In a further embodiment, the CGWs available to the MTC devices are listed in order of priority in accordance with number of credentials available at the respective CGW, where the list is complemented with one or more criteria to be satisfied. For instance, the list could further include expected communication quality of using the respective CGW, such that selection of a CGW having inferior expected communication quality is avoided even though it has access to a great number of credentials. Thus, if the CGW having the greatest number of credentials available does not fulfil a predetermined quality criterion, a next highest CGW fulfilling the criteria is connected to. In case two or more CGWs have the same (greatest) number of credentials, such a CGW is evaluated before turning to a CGW having a lower number of credentials. Another example is that the criterion to be used in combination with the CGW priority list is that the CGW has to be available to the MTC device, i.e. reachable from the MTC device. In such a case the MTC device would select the first CGW in the list that is available/reachable. This example alternative may be useful e.g. if the CGW priority list is created by an entity that is not aware of which CGWs that are available/reachable to/from the MTC device.

Figure 2C:
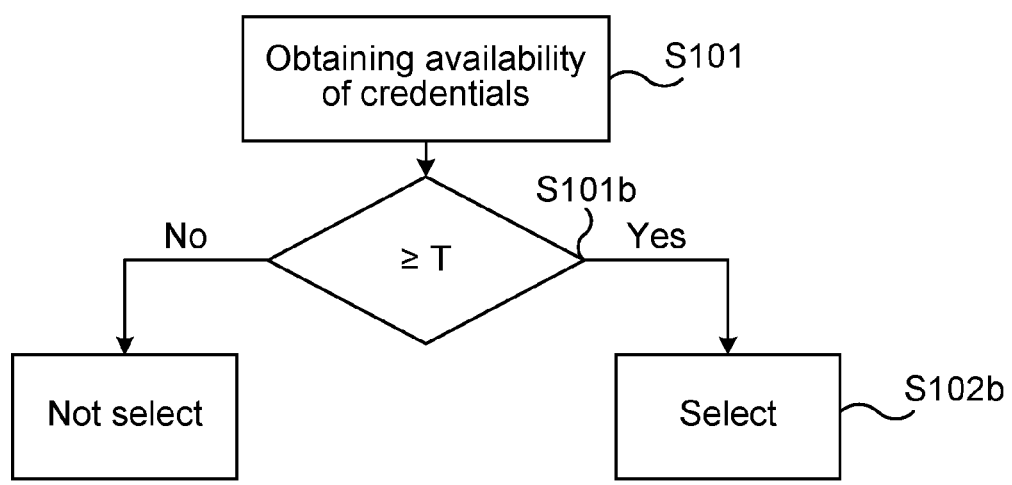
FIG. 2C illustrates a flow chart of yet a further embodiment of the method according to the present invention.

FIG. 2C illustrates a flow chart of yet a further embodiment of the method according to the present invention. Reference is further made to network elements shown in FIG. 1. In this further embodiment of the present invention, the CGW selection indicates preference for CGWs where the number of credentials available obtained in step S101 equals to or exceeds a predetermined credential threshold value T. For instance, the credential threshold value is set in step S101b such that a CGW 11A, 11B is selected only if it has credentials left to serve more than two MTC devices 10A, 10B, 10C. Hence, a CGW whose pool of credentials would be depleted if the MTC device connects to it is avoided when possible thereby giving other MTC devices, which may have no other CGW in reach, a chance to be served. Thus, in an embodiment, the credential threshold value is advantageously set to correspond to a number of credentials enough to serve at least two MTC devices. As can be seen in step S102b, only a CGW for which the number of credentials equals to or exceeds the threshold value is connected to.

Further, in case more than one CGW have a number of credentials available being equal to or exceeding the credential threshold value, the CGW having the greatest number of credentials could advantageously be selected for connection to the RAN. In line with previously discussed embodiments, one or more additional criteria (such as e.g. communication quality) may have to be satisfied for a CGW to be selected even though the CGW has a number of credentials exceeding the credential threshold value. In a further example, assuming for instance that the quality of the channel between an MTC device and a first CGW is not considered sufficiently good, a second CGW having a fewer number of credentials—but better channel quality—is selected for connecting the MTC device to the RAN.

As has been described in the above, even though an MTC device 10A, 10B itself may be responsible for executing selection of, and subsequent connection to, CGWs 11A, 11B, e.g. in terms of association with a Wi-Fi CGW, appropriate entities in the network 14 may preferably be allowed to maintain some level of control over the MTC devices' selections. This control may be implemented in the form of explicit instructions, policies/rules based on contextual input parameters, and/or modification of contextual parameters that may indirectly affect the MTC devices selection of CGW. The information about the availability of 3GPP/USIM credentials in the CGWs may be communicated in a number of different manners and from a number of different network entities.

Figure 3:
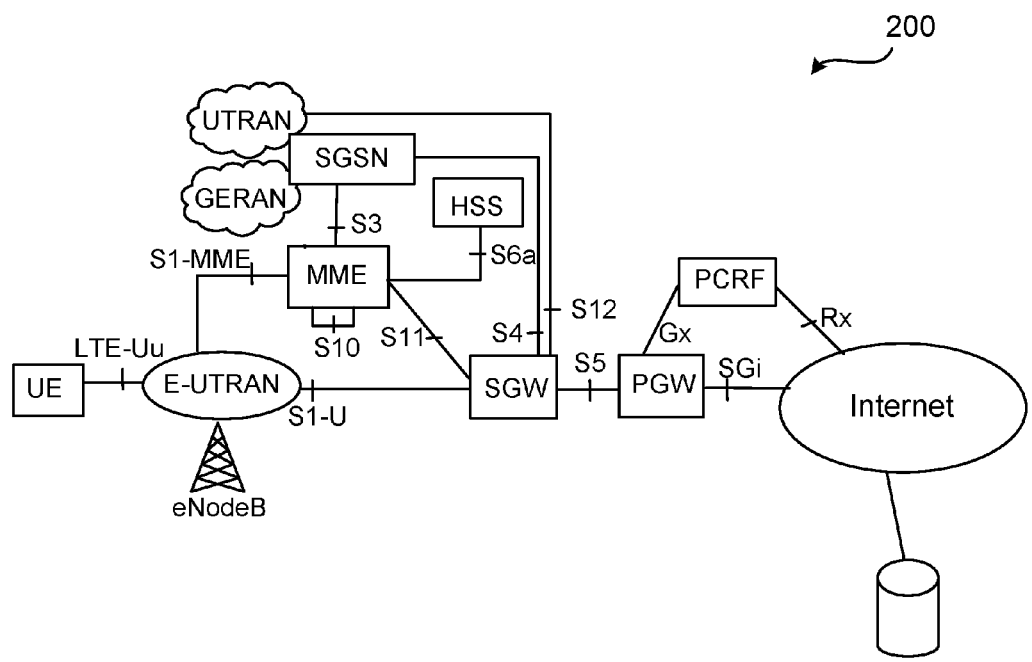
FIG. 3 shows a schematic overview of an exemplifying wireless communication system in which the present invention can be implemented.

FIG. 3 shows a schematic overview of an exemplifying wireless communication system 200 in which the present invention can be implemented. The wireless communication system 200 is an LTE based system. It should be pointed out that the terms "LTE" and "LTE based" system is here used to comprise both present and future LTE based systems, such as, for example, advanced LTE systems. It should be appreciated that although FIG. 3 shows a wireless communication system 200 in the form of an LTE based system, the example embodiments herein may also be utilized in connection with other wireless communication systems, such as e.g. GSM or UMTS, comprising nodes and functions that correspond to the nodes and functions of the system in FIG. 3.

The wireless communication system 200 comprises one or more base stations in the form of eNodeBs, operatively connected to a Serving Gateway (SGW), in turn operatively connected to a Mobility Management Entity (MME) and a Packet Data Network Gateway (PGW), which in turn is operatively connected to a Policy and Charging Rules Function (PCRF). The eNodeB is a radio access node that interfaces with a mobile radio terminal, e.g. a UE or an Access Point. The eNodeB of the system forms the radio access network called Evolved Universal Terrestrial Radio Access Network (E-UTRAN) for LTE communicating with the UE over an air interface such as LTE-Uu. The core network in LTE is known as Evolved Packet Core (EPC), and the EPC together with the E-UTRAN is referred to as Evolved Packet System (EPS). The SGW routes and forwards user data packets over the S1-U interface, whilst also acting as the mobility anchor for the user plane during inter-eNodeB handovers and as the anchor for mobility between LTE and other 3rd Generation Partnership Project (3GPP) technologies (terminating S4 interface and relaying the traffic between 2G/3G systems and PGW). For idle state UEs, the SGW terminates the downlink data path and triggers paging when downlink data arrives for the UE, and further manages and stores UE contexts, e.g. parameters of the IP bearer service, network internal routing information. It also performs replication of the user traffic in case of lawful interception. The SGW communicates with the MME via interface S11 and with the PGW via the S5 interface. Further, the SGW may communicate with the UMTS radio access network UTRAN and with the GSM EDGE ("Enhanced Data rates for GSM Evolution") Radio Access Network (GERAN) via the S12 interface.

The MME is responsible for idle mode UE tracking and paging procedure including retransmissions. It is involved in the bearer activation/deactivation process and is also responsible for choosing the SGW for a UE at the initial attach and at time of intra-LTE handover involving core network node relocation. It is responsible for authenticating the user by interacting with the Home Subscriber Server (HSS). The Non-Access Stratum (NAS) signaling terminates at the MME and it is also responsible for generation and allocation of temporary identities to UEs via the S1-MME interface. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the Serving General Packet Radio Service (GPRS) Support Node (SGSN). The MME also terminates the S6a interface towards the home HSS for roaming UEs. Further, there is an interface S10 configured for communication between MMEs for MME relocation and MME-to-MME information transfer.

The PGW provides connectivity to the UE to external packet data networks (PDNs) by being the point of exit and entry of traffic for the UE. A UE may have simultaneous connectivity with more than one PGW for accessing multiple PDNs. The PGW performs policy enforcement, packet filtering for each user, charging support, lawful Interception and packet screening. Another key role of the PGW is to act as the anchor for mobility between 3GPP and non-3GPP technologies such as WiMAX and 3GPP2 (CDMA 1× and EvDO). The interface between the PGW and the packet data network, being for instance the Internet, is referred to as the SGi. The packet data network may be an operator external public or private packet data network or an intra operator packet data network, e.g. for provision IP Multimedia Subsystem (IMS) services.

The PCRF determines policy rules in real-time with respect to the radio terminals of the system. This may e.g. include aggregating information in real-time to and from the core network and operational support systems, etc. of the system so as to support the creation of rules and/or automatically making policy decisions for user radio terminals currently active in the system based on such rules or similar. The PCRF provides the PGW with such rules and/or policies or similar to be used by the acting PGW as a Policy and Charging Enforcement Function (PCEF) via interface Gx. The PCRF further communicates with the packet data network via the Rx interface.

Figure 4:
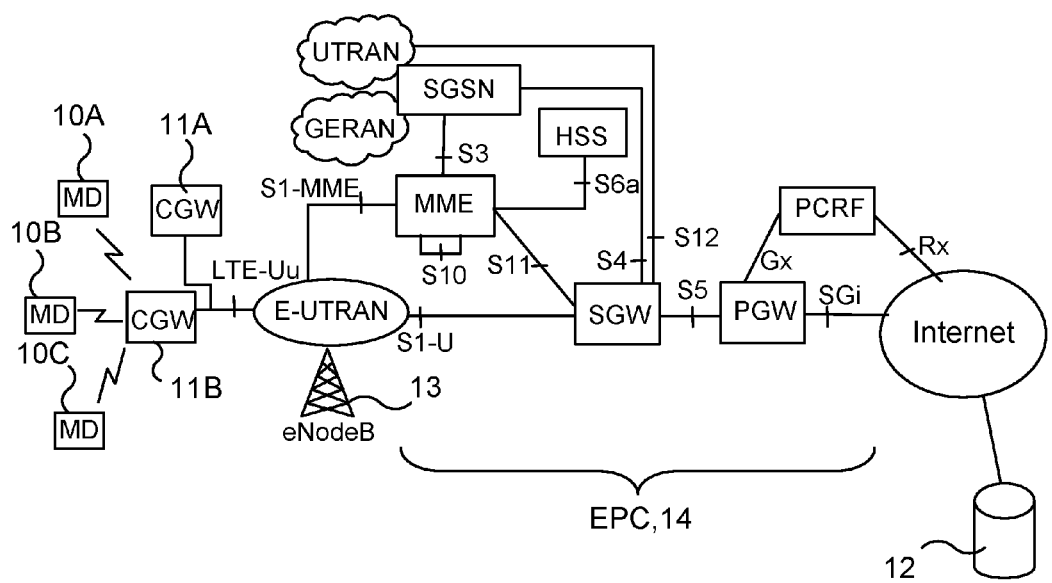
FIG. 4 shows a schematic overview of the exemplifying wireless communication system of FIG. 3 with an embodiment of the present invention implemented.

FIG. 4 illustrates the LTE network of FIG. 3 but with the capillary network according to embodiments of the present invention further implemented. Thus, the MTC devices 10A, 10B, 10C select (and subsequently connect to) one or more of the CGWs 11A, 11B based at least in part on the number of credentials available at the CGWs, and further connect to the cellular EPC network 14 via eNodeB 13 in the E-UTRAN (and possibly to the application server 12 via the Internet).

In an embodiment of the present invention, the obtaining of availability of credentials at the CGWs 11A, 11B and the taking of a decision to connect the MTC devices to a selected CGW based on the available credentials, as has been described throughout various embodiments in the above, may be undertaken at a network node in the EPC 14 by a functional network entity referred to as a Capillary Network Function (CNF). The CNF may for instance be implemented at a network hierarchical level of the SGW, the PGW or another supervising network node. The CNF is intended to handle various tasks related to the capillary network, in particular the CGW, such as configuration and may possibly also to some extent be involved in traffic processing.

The CNF may thus exercise network control of the MTC devices 10A, 10B, 10C regarding the choice of CGW 11A, 11B to connect to through explicit instructions submitted to the MTC devices 10A, 10B, 10C, such as an instruction to connect to another CGW than the CGW that an MTC device currently camps on.

In an alternative, the CGWs 11A, 11B exchange information, e.g. across the capillary network, about their respective availability of credentials. In another variant all CGWs 11A, 11B send their respective credential information to the CNF, which in turn distributes the information to the other CGWs connected to the same capillary network. In yet an alternative, the CNF is inherently aware of the credentials that are available in the different CGWs 11A, 11B and distributes this information to the CGWs of the same capillary network. The CNF may have access to this information for instance since it may be involved in the configuring of the CGWs 11A, 11B with the credentials and may also have capability to keep track of the MTC devices 10A, 10B, 10C communicating via the CGWs, thereby keeping track of the credentials currently being used. Either way, the result is that all the CGWs 11A, 11B connected to the same capillary network will be aware of the credentials that are available in all the other CGWs and hence any of the CGWs can determine which CGW an MTC device should select at least partly based on the credentials available at the CGWs, and possible additional criteria, as previously has been described. When determining which CGW to select, CGWs may also take into account information about the MTC devices 10A, 10B, 10C and/or a particular application the respective MTC device is running. The CGW may e.g. derive such information from monitoring of the traffic of the MTC devices, or from information received from the MTC devices.

In case one of the CGWs 11A, 11B to which an MTC device currently is connected sends an instruction to the MTC device to select a certain alternative CGW, the current CGW could send the instruction e.g. in the form of a field in a RPL message, as a link layer message, in a Constrained Application Protocol (CoAP) message, in an Open Mobile Alliance Lightweight M2M (OMA-LWM2M) message or as a parameter in a unicast IPv6 router advertisement.

It is possible to implement the CNF at a dedicated Operations & Maintenance (O&M) network node for management of MTC devices, CGWs and/or capillary networks (even though the MTC device data traffic typically would not pass through the O&M network node).

Irrespective of whether the CGW, the CNF or another appropriate network node makes the CGW selection decision on behalf of an MTC device, the network node may, depending on the scenario, have to be provided with the CGWs that are currently reachable for a given MTC device and possibly also other contextual parameters such as the channel quality of the MTC device with respect to different CGWs and/or the type of application the MTC device is running or the communication requirements of this application.

Instead of submitting explicit instructions to the MTC devices 10A, 10B, 10C to connect to a selected CGW 11A, 11B, the EPC network 14 may exercise its control over the selection of a CGW of an MTC device based on credentials according to embodiments of the present invention indirectly through policies/rules. These policies/rules are preferably configured in the MTC device by the previously mentioned O&M entity (not shown in FIG. 4), possibly via the CNF/PGW (in this particular example). If the O&M entity or the CNF does not have a direct relation to the MTC devices 10A, 10B, 10C, configuration data may be sent to one or more of the CGWs 11A, 11B to be forwarded to the MTC devices. All the MTC devices 10A, 10B, 10C in the capillary network may be configured with the same policies/rules, but individually adapted policies/rules provides for a more flexible network, e.g. in order to allow different types of MTC devices and/or applications in the same capillary network. One approach for implementing individual policy/rule adaptation without sending individual policy/rule instructions to each and every MTC device in a capillary network is to consider type of MTC device/application during configuration of the policy/rule, i.e. making the type of MTC device/application a contextual parameter and include the parameter in network policy configuration data. That is, the type of MTC device/application becomes an input parameter to a policy/rule, which affects the outcome of the algorithm defined by the policy/rule.

Figure 5:
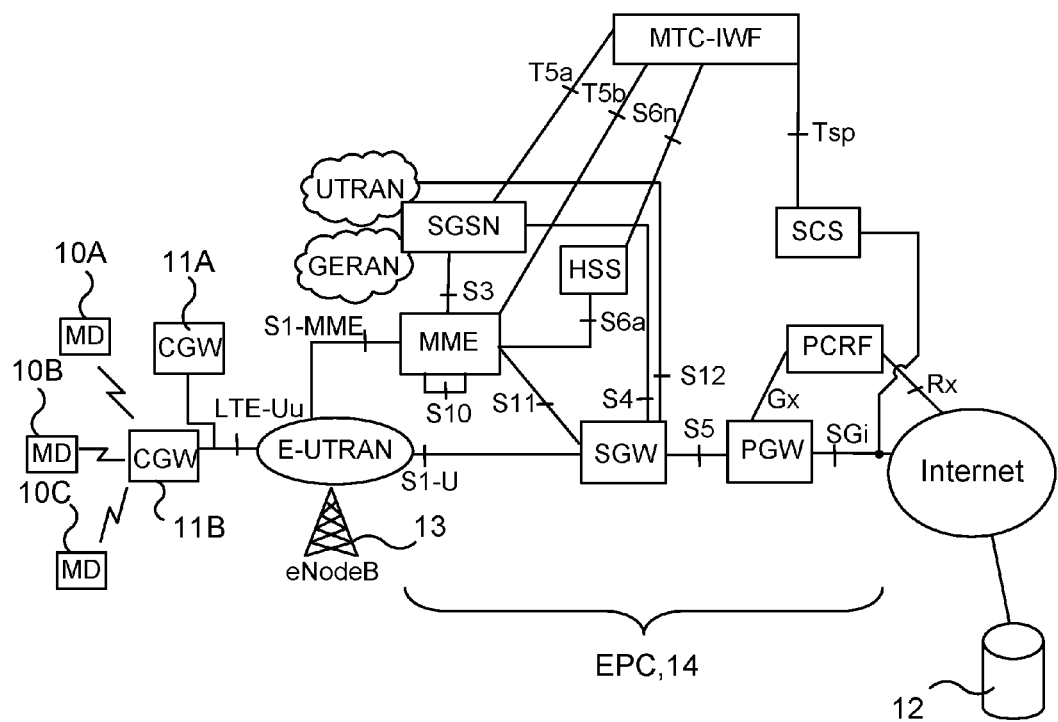
FIG. 5 shows a schematic overview of the exemplifying wireless communication system of FIG. 3 with another embodiment of the present invention implemented.

FIG. 5 illustrates the LTE network of FIG. 4 implementing the capillary network according to embodiments of the present invention, but with a number of further network nodes implemented as proposed in 3GPP TS 23.682 V11.3.0, "3rd Generation Partnership Project; Technical Specification Group Services and System Aspects; Architecture enhancements to facilitate communications with packet data networks and applications (Release 11)", December 2012, which are generally implemented for handling MTC devices in a cellular network. In the LTE network of FIG. 5, a Machine Type Communication Inter-Working Function (MTC-IWF) node and a Services Capability Server (SCS) have been added. The previously discussed CNF, which in FIG. 4 was exemplified as being implemented at a level of the PGW is in this particular exemplifying embodiment implemented at the SCS level, which SCS is connected to the PGW via the SGi interface, the MTC-IWF via a Tsp interface and to the application server 12 via the Internet or another packet data network, even though the application server 12 could be directly connected to the SCS.

Figure 6A:
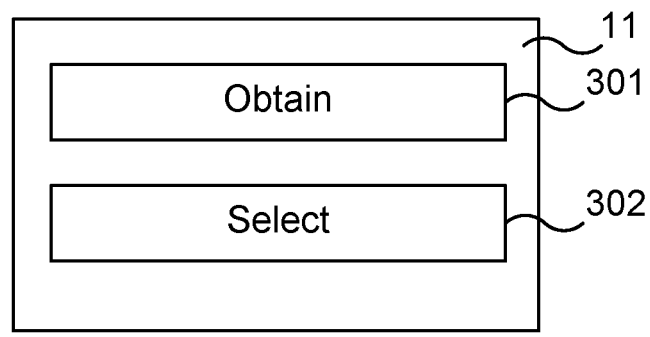
FIG. 6a shows a network node according to an embodiment of the present invention.

FIG. 6a shows a network node 11 according to an embodiment of the present invention. The network node 11 comprises obtaining means 301 adapted to obtain an indication of availability of credentials of a plurality of capillary network gateway nodes being capable of connecting an MTC device to the radio access network. Further, the network node 11 comprises selecting means 302 adapted to select one of the plurality of capillary network gateway nodes via which the MTC device is to be connected to the radio access network based at least in part on the availability of credentials of the plurality of capillary network gateway nodes. The obtaining means 301 and/or the selecting means 302 may comprise a communications interface for receiving and providing information to other devices. The obtaining means 301 may further comprise a local storage for storing obtained data. The obtaining means 301 and selecting means 302, may (in analogy with the description given in connection to FIG. 1) be implemented by a processor embodied in the form of one or more microprocessors arranged to execute a computer program downloaded to a suitable storage medium associated with the microprocessor, such as a RAM, a Flash memory or a hard disk drive. The obtaining means 301 and selecting means 302 may comprise one or more transmitters and/or receivers and/or transceivers, comprising analogue and digital components and a suitable number of antennae for radio communication.

Figure 6B:
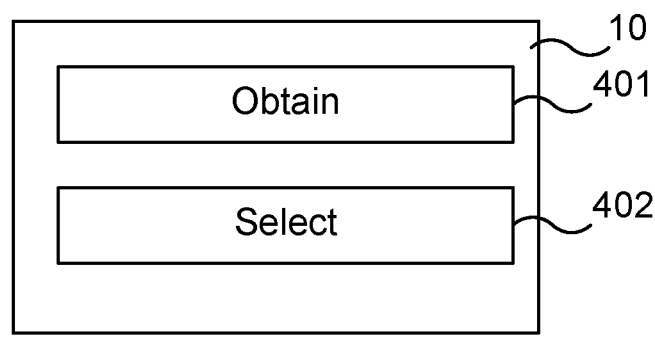
FIG. 6b shows an MTC device according to an embodiment of the present invention.

FIG. 6b shows an MTC device 10 according to an embodiment of the present invention. The MTC device 10 comprises obtaining means 401 adapted to obtain an indication of availability of credentials of a plurality of capillary network gateway nodes being capable of connecting the MTC device to the radio access network. Further, the MTC device 10 comprises selecting means 402 adapted to select one of the plurality of capillary network gateway nodes via which the MTC device is to be connected to the radio access network based at least in part on the availability of credentials of the plurality of capillary network gateway nodes. The obtaining means 401 and/or the selecting means 402 may comprise a communications interface for receiving and providing information to other devices. The obtaining means 401 may further comprise a local storage for storing obtained data. The obtaining means 401 and selecting means 402, may (in analogy with the description given in connection to FIG. 1) be implemented by a processor embodied in the form of one or more microprocessors arranged to execute a computer program downloaded to a suitable storage medium associated with the microprocessor, such as a RAM, a Flash memory or a hard disk drive. The obtaining means 401 and selecting means 402 may comprise one or more transmitters and/or receivers and/or transceivers, comprising analogue and digital components and a suitable number of antennae for radio communication.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:
1. A method of selecting a capillary network gateway node for connecting a Machine Type Communication, MTC, device to a radio access network, comprising:

obtaining an indication of availability of credentials of a plurality of capillary network gateway nodes being capable of connecting the MTC device to the radio access network;

comparing a number of credentials available at each of the plurality of capillary network gateway nodes with a credential threshold value; and selecting one of the plurality of capillary network gateway nodes via which the MTC device is to be connected to the radio access network based at least in part on the availability of credentials of the plurality of capillary network gateway nodes and for which the number of credentials is equal to or exceeds the credential threshold value.

2. The method of claim 1, wherein the credential threshold value is set to correspond to a number of credentials enough to serve two MTC devices.

3. The method of claim 1, wherein the step of selecting comprises:

selecting the one of the plurality of capillary network gateway nodes having a greatest number of credentials available.

4. The method of claim 1, wherein the step of selecting comprises:

selecting the one of the plurality capillary network gateway nodes if an additional criterion is satisfied.

5. The method of claim 4, wherein in case the additional criterion is not satisfied for said one of the plurality of capillary network gateway nodes, another one of the plurality of capillary network gateway nodes having a greatest number of credentials available, and satisfying the additional criterion, is selected.

6. The method of claim 4, the additional criteria comprising one or more of: quality of channel between the MTC device and the respective capillary network gateway node, required transmission power of the MTC device when transmitting to the respective capillary network gateway node, battery/energy status of the MTC device, physical location of the MTC device, distance from the MTC device to the respective capillary network gateway node, capability of the MTC device to reach the respective capillary network gateway node and capillary network technology used by the respective capillary network gateway node.

7. The method of claim 1, wherein the step of obtaining an indication of availability of credentials comprises:

receiving, at the MTC device, the indication of availability of credentials from one or more of the plurality of capillary network gateway nodes; or receiving, at least one of the plurality of capillary network gateway nodes, the indication of availability of credentials.

8. The method of claim 1, wherein the step of obtaining an indication of availability of credentials comprises:

receiving the indication of availability of credentials at a network node being any one selected from a group comprising a Serving Gateway, SGW, a Packet Data Network Gateway, PGW, and an Evolved NodeB, eNodeB, in a Long Term Evolution, LTE, network, any one selected from a group comprising a Serving General Packet Radio Service Support Node, SGSN, a Gateway General Packet Radio Service Support Node, GGSN, a Radio Network Controller, RNC, and a NodeB, in a Universal Mobile Telecommunication System, UMTS, network, any one selected from a group comprising a SGSN, a GGSN, a Base Station Controller, BSC, and a Base Transceiver Station, BTS, in a Global System for Mobile communications, GSM, network, a Services Capability Server, SCS, and an Operation and Maintenance node.

9. A network node configured to select a capillary network gateway node for connecting a Machine Type Communication, MTC, device to a radio access network, comprising a processing unit and a memory, said memory containing instructions executable by said processing unit, whereby said network node is operative to:

obtain an indication of availability of credentials of a plurality of capillary network gateway nodes being capable of connecting the MTC device to the radio access network;

compare a number of credentials available at each of the plurality of capillary network gateway nodes with a credential threshold value; and select one of the plurality of capillary network gateway nodes via which the MTC device is to be connected to the radio access network based at least in part on the availability of credentials of the plurality of capillary network gateway nodes and for which the number of credentials is equal to or exceeds the credential threshold value.

10. The network node of claim 9, wherein the credential threshold value is set to correspond to a number of credentials enough to serve two MTC devices.

11. The network node of claim 9, further being operative to:

select the one of the plurality of capillary network gateway nodes having a greatest number of credentials available.

12. The network node of claim 9, further being operative to:

select the one of the plurality capillary network gateway nodes if an additional criterion is satisfied.

13. The network node of claim 12, further being operative to, in case the additional criterion is not satisfied for said one of the plurality of capillary network gateway nodes, connect the MTC device to another one of the plurality of capillary network gateway nodes having a greatest number of credentials available, and satisfying the additional criterion.

14. The network node of claim 9, said network node being any one selected from a group comprising a Serving Gateway, SGW, a Packet Data Network Gateway, PGW, and an Evolved NodeB, eNodeB, in a Long Term Evolution, LTE, network, any one selected from a group comprising a Serving General Packet Radio Service Support Node, SGSN, a Gateway General Packet Radio Service Support Node, GGSN, a Radio Network Controller, RNC, and a NodeB, in a Universal Mobile Telecommunication System, UMTS, network, any one selected from a group comprising a SGSN, a GGSN, a Base Station Controller, BSC, and a Base Transceiver Station, BTS, in a Global System for Mobile communications, GSM, network, a Services Capability Server, SCS, and an Operation and Maintenance node.

15. The network node of claim 9, comprising any one or more of said plurality of capillary network gateway nodes.

16. The network node of claim 15, the capillary network gateway nodes being any one selected from a group comprising a mobile phone, a personal digital assistant, PDA, a smart phone, a tablet, a laptop, a media player, a Bluetooth Access Point, an IEEE 802.15.4 based Access Point, AP, a Wi-Fi AP, and any other short range radio communication technology AP.

* * * * *